US008627055B2

(12) United States Patent  
Guo

(10) Patent No.: US 8,627,055 B2
(45) Date of Patent: Jan. 7, 2014

(54) WIMAX TERMINAL FOR CALCULATING A FIRST HASH VALUE TO A LOAD COMMAND AND FIRMWARE AND COMPARING THE FIRST HASH VALUE TO A SECOND HASH VALUE FROM THE EXECUTED LOAD COMMAND AND FIRMWARE

(75) Inventor: Junping Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 481 days.

(21) Appl. No.: 12/988,861

(22) PCT Filed: Dec. 29, 2008

(86) PCT No.: PCT/CN2008/073833
§ 371 (c)(1),
(2), (4) Date: Oct. 21, 2010

(87) PCT Pub. No.: WO2009/129687
PCT Pub. Date: Oct. 29, 2009

(65) Prior Publication Data
US 2011/0055543 A1    Mar. 3, 2011

(30) Foreign Application Priority Data
Apr. 25, 2008   (CN) .......................... 2008 1 0094066

(51) Int. Cl.
*G06F 11/30* (2006.01)
*G06F 7/04* (2006.01)
*G06F 7/38* (2006.01)

(52) U.S. Cl.
USPC ................. 713/2; 713/168; 713/193; 726/30; 726/23; 712/239

(58) Field of Classification Search
USPC .................. 711/217, 102; 713/189, 193, 168; 717/148, 154, 127; 726/30, 23, 26; 235/379
See application file for complete search history.

(56) References Cited

U.S. PATENT DOCUMENTS 6,308,320 B1 * 10/2001 Burch ........................... 717/154
6,779,108 B2 *  8/2004 Ju et al. ......................... 712/239

(Continued)

FOREIGN PATENT DOCUMENTS

CN    1423766 A    6/2003
CN    1550115 A    11/2004

(Continued)

OTHER PUBLICATIONS

Supplementary European Search Report for European Patent Application No. 08874053.5-2211, dated Nov. 29, 2012 (8 pages).

(Continued)

*Primary Examiner* — Thomas Lee
*Assistant Examiner* — Aurel Prifti
(74) *Attorney, Agent, or Firm* — Clark & Elbing LLP

(57) ABSTRACT

The present invention discloses a starting method of a WiMAX terminal and a terminal thereof, wherein, the starting method comprises: step S202, calculating a load command and a firmware required to be loaded for starting the terminal in advance to obtain a first firmware Hash and a first load command Hash, and storing the first firmware Hash and the first load command Hash in a predefined memory of the terminal; step S204, in response to a starting operation of the terminal, performing starting process and starting a boot loader; step S206, the boot loader executing the load command transmitted by a driver of the terminal to download the firmware to the terminal; step S208, the boot loader calculating a second firmware Hash of the downloaded firmware and a second load command Hash of the load command transmitted by the driver; step 210, the boot loader judging whether the first firmware Hash matches with the second firmware Hash, and judging whether the first load command Hash matches with the second load command Hash, and permitting to start the terminal under the circumstances that the first firmware Hash matches with the second firmware Hash and the first load command Hash matches with the second load command Hash.

15 Claims, 5 Drawing Sheets

(56) References Cited

U.S. PATENT DOCUMENTS

| | | |
|---|---|---|
| 7,168,065 B1 * | 1/2007 | Naccache et al. ............. 717/127 |
| 7,930,686 B2 * | 4/2011 | Mitran et al. ................ 717/148 |
| 7,937,593 B2 * | 5/2011 | Chen et al. .................... 713/189 |
| 8,140,824 B2 * | 3/2012 | Craft ............................ 711/217 |
| 2003/0099358 A1 | 5/2003 | Michael et al. |
| 2003/0216927 A1 | 11/2003 | Sridhar et al. |
| 2005/0138270 A1 * | 6/2005 | Morais et al. ................ 711/102 |
| 2005/0262576 A1 * | 11/2005 | Gassoway ...................... 726/30 |
| 2006/0059547 A1 | 3/2006 | Deloume et al. |
| 2006/0124730 A1 * | 6/2006 | Maloney ....................... 235/379 |
| 2006/0161773 A1 * | 7/2006 | Okazaki et al. .............. 713/168 |
| 2007/0136609 A1 * | 6/2007 | Rudelic et al. ................ 713/193 |
| 2008/0016576 A1 * | 1/2008 | Ueda et al. ...................... 726/26 |
| 2009/0328218 A1 * | 12/2009 | Tsurukawa .................... 726/23 |

FOREIGN PATENT DOCUMENTS

| | | |
|---|---|---|
| CN | 101299849 A | 11/2008 |
| WO | WO 01/61437 A2 | 8/2001 |
| WO | WO 03/021991 A1 | 3/2003 |

OTHER PUBLICATIONS

International Search Report for International Patent Application No. PCT/CN2008/073833, mailed Apr. 9, 2009.

* cited by examiner

WIMAX TERMINAL FOR CALCULATING A FIRST HASH VALUE TO A LOAD COMMAND AND FIRMWARE AND COMPARING THE FIRST HASH VALUE TO A SECOND HASH VALUE FROM THE EXECUTED LOAD COMMAND AND FIRMWARE

CROSS-REFERENCE TO RELATED APPLICATIONS

This application is the U.S. national stage filing under 35 U.S.C. §371 of International Application No. PCT/CN2008/073833, filed Dec. 29, 2008, which claims benefit of Chinese Patent Application No. 200810094066.6, filed Apr. 25, 2008.

FILED OF THE INVENTION

The present invention relates to communication field and in particular to a World Interoperability for Microwave Access (WiMAX) terminal and a starting method thereof.

BACKGROUND OF THE INVENTION

The WiMAX is a novel air interface standard proposed aiming at the frequency band of microwave and millimeter wave, it can support time division duplex (TDD) and frequency division duplex (FDD), and support selecting channel bandwidth step by step, wherein the bandwidth frequency can be 20 MHz, 10 MHz, 5 MHz, 2.5 MHz or 1.25 MHz, so that the operator can customize service and price for customers.

In virtue of the channel of 20 MHz and optimal modulation (namely, 256 Quadrature Amplitude Modulation (QAM)), the data transmission rate of the WiMAX can reach as high as 70-100 MB/s. Furthermore, adaptive modulation method is added in WiMAX technology, and this method allows wireless devices to select optimal modulation automatically according to link range, noises and other conditions. Besides, orthogonal frequency division multiplexing (OFDM) is also added in the WiMAX technology, this is a modulation/multiplexing/access technology for transmitting signals through a wideband, and similar to the CDMA, the OFDM can also reduce the influence of the following factors to the greatest extent, such as multiple path signal, diffraction, attenuation, and other phenomena related to microwave signal transmission. Besides, Reed Solomon forward error correction (FEC), convolutional encoding and interleaving access algorithm are also added in the WiMAX technology to determine and correct bit error. For the errors which can not be found out by the FEC, automatic repeat equipment (ARQ) function only needs to transmit the error data package again, that is, the errors could be corrected.

In addition, in order to further improve the reliability of the link, transmission and reception diversity and adaptive antenna are also added in the WiMAX technology. In security aspect, this technology comprises the widely used triple data encryption standard (3DES) which is a 168-bit cryptographic key and has highly safe encryption performance.

For developing a WiMAX terminal with mobile performance, the firmware of the WiMAX terminal is not stored in a flash, but stored in some place of a host, wherein the host generally refers to PC or the other hosts which use the WiMAX terminal. Whenever the device is inserted into the host and the system is started up, the firmware will be automatically downloaded to the random-access memory (RAM) of the device. After the download of the firmware image is completed, the real code of the firmware will be running on the CPU of an embedded chip.

The downloaded firmware can visit the hardware units on all chips, therefore, if any code can be downloaded at will, some malicious codes breaking the WiMAX protocol may be run, related agreements may be breached, some un-authorized network may be visited, even the performances of base station (BS) or mobile station (MS) nearby may deteriorate. Furthermore, the firmware may visit code identification non-volatile memory (NVM) with X.509 certificate and device cryptographic key on the chip.

Therefore, to authorize only reliable codes to run on the chip is very important. However, the technical scheme which can prevent the malicious code from running and ensure the correctness and security of terminal starting has not been proposed yet at present.

SUMMMARY OF THE INVENTION

The present invention is proposed with the consideration of the problem that the correctness and security during the starting of a terminal can not be ensured in the above mentioned related art. Therefore, the present mainly aims at providing a WiMAX terminal starting method and a WiMAX terminal with starting protection function to solve at least one of above-mentioned problems.

In order to achieve the above-mentioned aims, the present invention provides a starting method of a WiMAX terminal according to one aspect of the present invention.

The starting method of a WiMAX terminal according to the present invention comprises: S202, calculating a load command and a firmware required to be loaded for starting the terminal in advance to obtain a first firmware Hash and a first load command Hash, and storing the first firmware Hash and the first load command Hash in a predefined memory of the terminal; S204, in response to a starting operation of the terminal, performing starting process and starting a boot loader; S206, the boot loader executing the load command transmitted by a driver of the terminal and downloading the firmware to the terminal; S208, the boot loader calculating a second firmware Hash of the downloaded firmware and a second load command Hash of the load command transmitted by the driver; 210, the boot loader judging whether the first firmware Hash matches with the second firmware Hash, and judging whether the first load command Hash matches with the second load command Hash, and permitting to start the terminal under the circumstances that the first firmware Hash matches with the second firmware Hash and the first load command Hash matches with the second load command Hash.

Wherein, in S202, after obtaining the first firmware Hash and the first load command Hash, the method further comprises: encrypting the first firmware Hash and the first load command Hash using a public key; storing the encrypted first firmware Hash and first load command Hash in the predefined memory; storing a private key corresponding to the public key in the terminal.

Furthermore, in S210, during the judgment, the method further comprises: the boot loader decrypting the encrypted first firmware Hash and first load command Hash by using the stored private key, judging whether the decrypted first firmware Hash matches with the second firmware Hash, and judging whether the decrypted first load command Hash matches with the second load command Hash.

In addition, in S204, the starting process comprises: after the terminal is powered on, resetting a chip of the terminal; a CPU of the terminal running the specific code in the chip to start a read only memory of the terminal, initializing the hardware units required for starting the read only memory, and performing corresponding pin configuration; the CPU reading interface configuration information stored in a non-volatile memory of the terminal.

Besides, before the S210, the method further comprises: the driver transmitting the first firmware Hash and the first load command Hash to the chip of the terminal through a specific command; the boot loader obtaining the first firmware Hash and the first load command Hash in the specific command, wherein the specific command is used to start the terminal.

Furthermore, the boot loader executes the specific command under the circumstances that the boot loader judges the first firmware Hash matches with the second firmware Hash, and the first load command Hash matches with the second load command Hash. Wherein the specific command is a skip command.

Besides, in S210, under the circumstance that the judgment results are no, the method further comprises: the chip of the terminal is reset According to another aspect of the present invention, the present invention provides a WiMAX terminal.

The terminal comprises: a storage module, configured to store a first firmware Hash and a first load command Hash obtained through calculating a load command and a firmware required to be loaded for starting the terminal in advance; a first starting module, configured to perform starting process and to start a boot loader in response to a starting operation of the terminal; an executing module, configured to execute the load command transmitted by a driving module of the terminal; a downloading module, configured to download the firmware to the terminal; a calculating module, configured to calculate a second firmware Hash of the downloaded firmware and a second load command Hash of the load command transmitted by the driver module; a matching module, configured to judge whether the first firmware Hash stored in the storage module matches with the second firmware Hash calculated by the calculating module, and to judge whether the first load command Hash stored in the storage module matches with the second load command Hash calculated by the calculating module; and a second starting module, configured to permit to start the terminal under the circumstances that the judging result of the matching module is: the first firmware Hash matches with the second firmware Hash and the first load command Hash matches with the second load command Hash.

Through at least one of the above-mentioned technical schemes, the present invention obtains the firmware Hash and the load command Hash through calculating the firmware required to be loaded for starting the terminal and the load command in advance, calculates the firmware Hash and the load command Hash of the load command and the firmware downloaded by the terminal, and then matches the two firmware Hashes and the two load command Hashes respectively, starts the terminal if the matching result is yes, thus a complete security protection for the starting of the terminal can be provided the starting efficiency of the terminal is improved, and the protection processing thereof is not easy to be detected or intercepted, thereby high security is achieved.

Other characteristics and advantages of the present invention will be described in the following specification, and will be apparent partly from the specification and embodiments of the present invention. The objects and other advantages can be realized and obtained through the structure specially illustrated in the specification, claims, and the drawings.

BRIEF DESCRIPTION OF THE DRAWINGS

The drawings are used to provide a further understanding to the present invention and constitute a part of the specification. The exemplary embodiments of the present invention and the explanation thereof are given thereafter by way of illustration only, and thus are not limitative of the present invention, and wherein.

DETAILED DESCRIPTION OF EMBODIMENTS

General Description of Functions

In the technical scheme provided by an embodiment of the present invention, the firmware required to be loaded for starting the terminal and the load command are calculated in advance, compared respectively with the calculation results of the firmware downloaded by the terminal and the load command. If the comparison result is matching, it means that the downloaded firmware is safe, and in this case the terminal will work normally; and if the comparison result is mismatching, it means that the downloaded firmware is illegal, and in this case the chip will be reset and the terminal is not able to work.

The preferable embodiments of the present invention will be detailed hereinafter in connection with the drawings. What should be understood is that the preferable embodiments detailed hereafter are given by way of illustration only, and thus are not limitative of the present invention. What needs to be explained is that if un-conflictive, the embodiments of the present invention and the features therein can be combined with each other.

Figure 1:
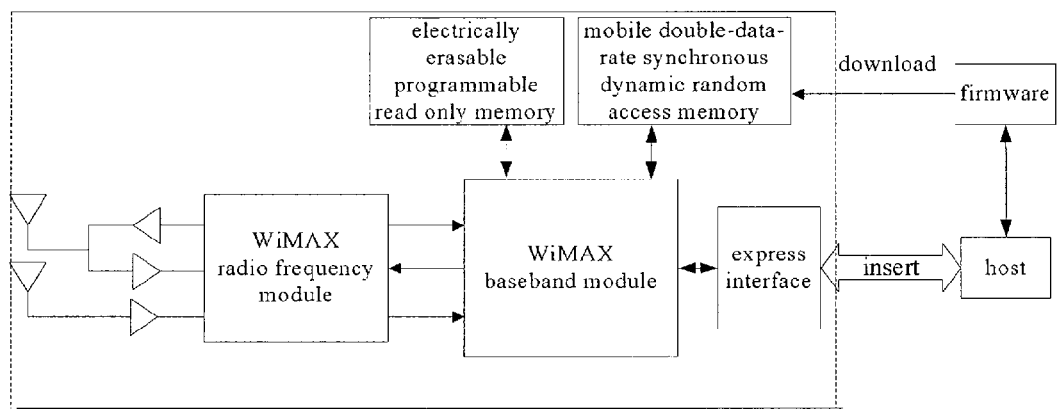
FIG. 1 is a structural schematic diagram of a WiMAX terminal applied by the starting method of a WiMAX terminal according to a method embodiment of the present invention.

FIG. 1 is a structural schematic diagram of the WiMAX terminal. As shown in FIG. 1, the WiMAX terminal comprises a WiMAX RF (radio frequency module), a WiMAX BB (baseband module), an EEPROM (electrically erasable programmable read only memory), a Mobile DDR RAM (mobile double-data-rate synchronous dynamic random access memory), and an express interface. Different from other types of terminals, the firmware of the WiMAX terminal is not stored in the flash, but stored in a host. When the device is inserted into the host and the system is powered on, corresponding firmware can be downloaded to the device to start running. The embodiments of the present invention will be detailed hereafter on the basis of this working mechanism.

Method Embodiment

A starting method of a WiMAX terminal is provided in this embodiment.

Figure 2:
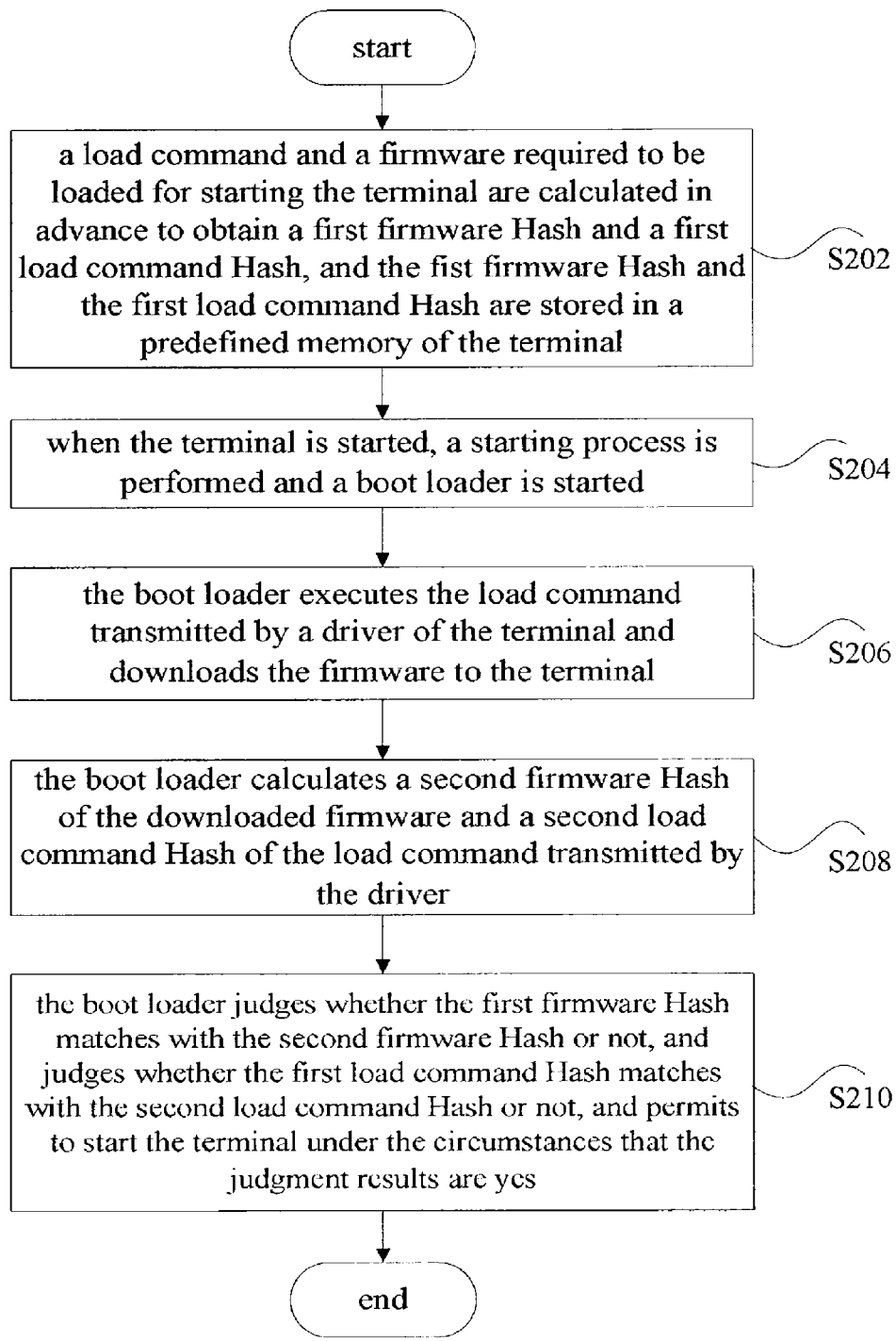
FIG. 2 is a flowchart of the starting method of the WiMAX terminal according to a method embodiment of the present invention.

FIG. 2 is a flowchart of the starting method of the WiMAX terminal according to this embodiment. As shown in FIG. 2, the starting method of the WiMAX terminal according to the embodiment comprises:

Step S202, a load command and a firmware required to be loaded for starting the terminal are calculated in advance to obtain a first firmware Hash and a first load command Hash, and the first firmware Hash and the first load command Hash are stored in a predefined memory of the terminal, wherein, after obtaining the first firmware Hash and the first load command Hash, the first firmware Hash and the first load command Hash may be encrypted using a public key, the encrypted first firmware Hash and first load command Hash are stored in the predefined memory, and a private key corresponding to the public key is stored in the terminal.

Step S204, when the terminal is started, a starting process is performed and a boot loader is started. Wherein, the starting process can be performed as follows: after the terminal is powered on, a chip of the terminal is reset; a CPU of the terminal runs the specific code in the chip to start a read only memory of the terminal, initializes the hardware units required for starting the read only memory, and performs corresponding pin configuration; the CPU reads interface configuration information stored in a non-volatile memory of the terminal.

Step S206, the boot loader executes the load command transmitted by a driver of the terminal and downloads the firmware to the terminal;

Step S208, the boot loader calculates a second firmware Hash of the downloaded firmware and a second load command Hash of the load command transmitted by the driver;

Step 210, the boot loader judges whether the first firmware Hash matches with the second firmware Hash or not, and judges whether the first load command Hash matches with the second load command Hash or not, and permits to start the terminal only under the circumstances that the judgment results are both matching. Concretely, the driver transmits the first firmware Hash and the first load command Hash to the chip of the terminal through a specific command which is used for starting the terminal; the boot loader obtains the first firmware Hash and the first load command Hash in the specific command; the boot loader decrypts the encrypted first firmware Hash and first load command Hash by using the stored private key, and judges whether the decrypted first firmware Hash matches with the second firmware Hash, and judges whether the decrypted first load command Hash matches with the second load command Hash.

If the boot loader judges the first firmware Hash matches with the second firmware Hash, and the first load command Hash matches with the second load command Hash, the specific command will be executed. For example, the specific command may be a skip command. On the other hand, in the specific implementing process, if any one of the judgment results in step S210 is mismatching, the chip of the terminal will be reset.

As seen from above descriptions, the starting method of the terminal in the embodiment of the present invention may comprise two sections: production presetting and practical use. Wherein, the production presetting section mainly completes the calculation and encryption of the Hashes of the firmware and the load command (namely, the first firmware Hash and the first load command Hash); and the practical use section relates to the processing of realizing safe Boot by the terminal. At last, the Hash results (namely, the second firmware Hash and the second load command Hash) calculated during the working of an individual device are compared with the Hash results preset by the production section. If the comparison result is yes, it means that the firmware is safe and the device will work normally; and if the comparison result is no, it means that the firmware is illegal, the chip will be reset and the terminal will not be able to work.

Based on the above descriptions, a specific realization process of the embodiment of the present invention will be further detailed hereafter.

Step 1, the production presetting unit at the WiMAX terminal calculates the Hashes of the firmware and the load command, and then encrypts the Hash results thereof. This step completes the content of the production presetting section.

Figure 3:
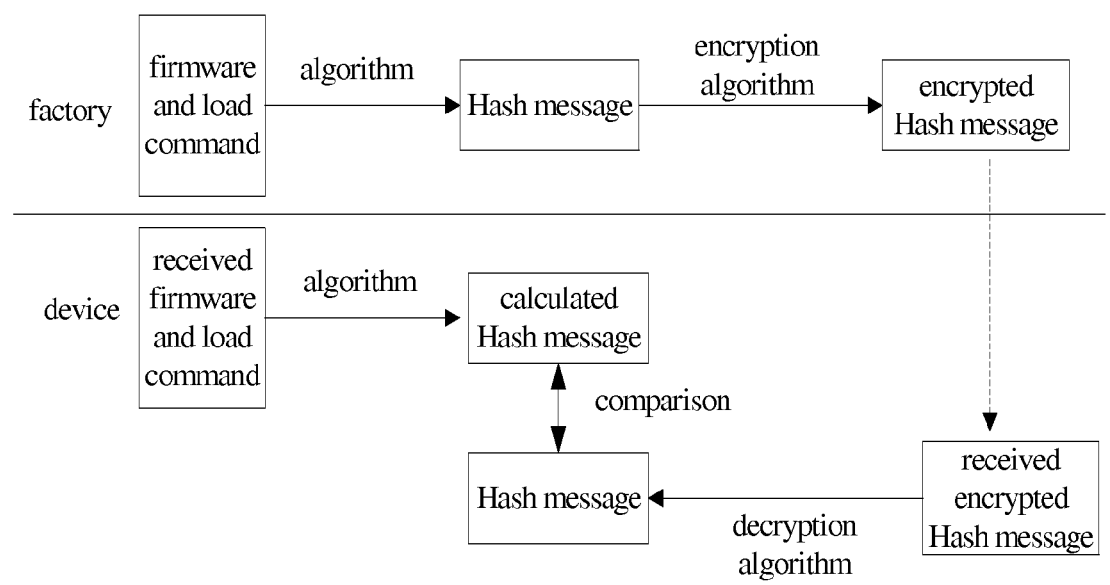
FIG. 3 is a processing schematic diagram of the starting method of the WiMAX terminal according to a method embodiment of the present invention.

FIG. 3 is a processing schematic diagram of the starting method of the WiMAX terminal according to a method embodiment of the present invention. As shown in FIG. 3, the production presetting unit at the WiMAX terminal calculates the Hashes of the firmware and the load command (namely, the first firmware Hash and the first load command Hash) using a certain algorithm (e.g. SHA256), further encrypts the Hash results by using an encryption algorithm (e.g. RSA encryption private key) after obtaining the Hashes, obtains and stores the encrypted Hash results in order that the Hash messages can be restored (namely, decrypted) after the device is powered on, and judges whether the firmware and the load command are correct or not through comparing the Hash messages (namely, comparing the first firmware Hash with the second firmware Hash, and comparing the first load command Hash with the second load command Hash). Alternatively, besides the production presetting unit, the step can also be completed by a research and development unit or other units.

Step 2, the terminal is powered on and starts working.

Figure 4:
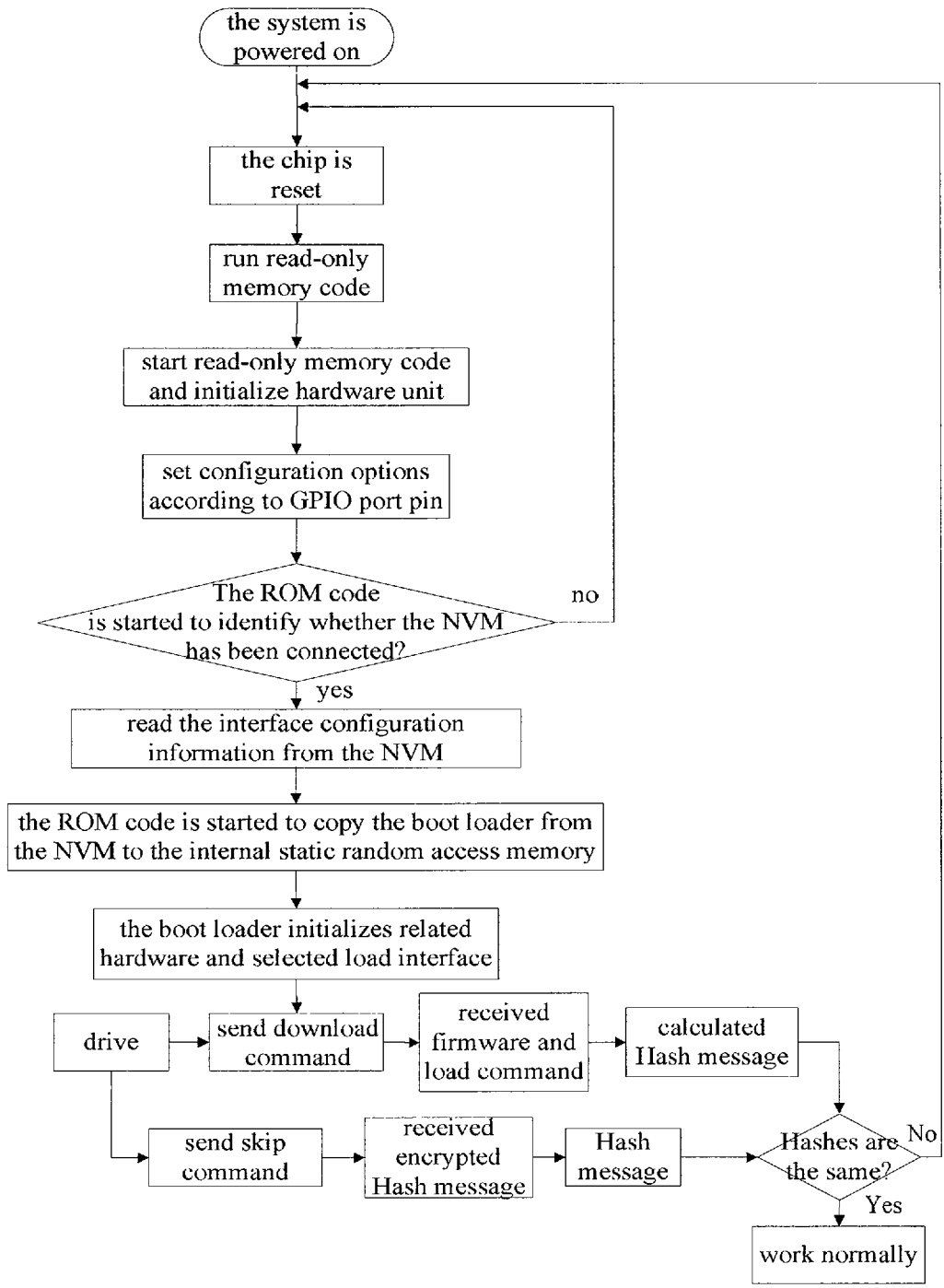
FIG. 4 is a detailed flowchart of the processing after the terminal is powered on in the starting method of the WiMAX terminal according to a method embodiment of the present invention.

FIG. 4 is a detailed flowchart of the processing after the terminal is powered on in the starting method of the WiMAX terminal according to a method embodiment of the present invention. As shown in FIG. 4, after the terminal is powered on, the chip is reset and the embedded CPU starts running the read only memory (ROM) code inside the chip to start the ROM, and the starting flow of the terminal begins, which is the first step of the safe Boot flow of the WiMAX terminal.

Step 3, the ROM code is started, the hardware units required to be used are initialized, and various kinds of configuration options are set according to GPIO pin as shown in FIG. 4. In this way, the foundation can be laid for invoking various software and hardware resources subsequently.

Step 4, the ROM code is started, whether the NVM is successfully connected is identified, and the interface configuration information is read from the NVM. Wherein, the NVM may be the EEPROM or other memories in the WiMAX terminal, and is mainly used for storing some key information such as the interface configuration information required during the starting of the terminal.

Step 5, after obtaining the interface configuration information from the NVM, the ROM is started, and the Boot loader is started (the safe Boot loader may be copied from the NVM to the internal static random access memory (SRAM)). Next, the Boot loader starts miming on the CPU, wherein the Boot loader can be defined as a safe boot loader, is an important unit for completing the safe starting, and can be an independent device with the following functions and features:

(1) Prevent the stack and code of the Boot loader from being covered by download commands;

(2) Check the firmware when the firmware is downloaded to a pure static memory, and protect special registration and the I/O information mapped by the memory;

(3) During image download, prevent buffer memory and integer from overflowing (or other uses);

(4) All the parameters of the download command are effective;

(5) Only necessary download commands will be executed;

(6) Comprise a public cryptographic key which is used for checking downloaded image signature;

(7) During command procedure, calculate the downloaded firmware Hash (the first firmware Hash) (and when the data is copied into the static memory);

(8) Check the image signature of downloaded firmware (including the addresses of each downloaded data block);

(9) Perform image signature through the SHA-256 algorithm and RSA 2048 algorithm in a safety device; private signature cryptographic key does not leave safety server.

Step 6, according to the configuration information obtained from the NVM, the Boot loader starts to initialize related hardware and selected load interface, executes the initialization, the foundation for invoking software resources can be provided, and preparation for security identification can be completed;

Step 7, as shown in FIG. 4, the driver starts to send download command to the chip. The command is executed by the Boot loader. The download command comprises the address and data information written into the internal SRAM. After receiving the download command, the chip starts to download the firmware. As shown in FIG. 3, after receiving the firmware, the Boot loader calculates the Hash results of the firmware and the download command (address and data). For example, the calculation may adopt SHA-256 algorithm. The calculated results will be compared with the calculated results (as shown in FIG. 3) of the signature provided in step 8. If the two kinds of results are the same, it is correct; otherwise, it is abnormal.

Step 8, the last download command sent by the driver is the skip command which indicates the initial position of the firmware code in detail. That firmware code initiates from different places determines the current starting is normal or abnormal. If the starting is abnormal, the chip will be reset. The skip command also comprises the signature of the downloaded firmware, namely the preset and encrypted Hash message (namely, the first firmware Hash and the first load command Hash) in the production section.

Step 9, the Boot loader verifies the signature information. If the signature is effective, the Boot loader executes the skip command, and the device works normally; otherwise, the chip will be reset.

Wherein, the Boot loader verifies the signature information according to the encryption algorithm consistent with production presetting section, for example, the RSA (2048Key) can be used to decrypt and verify the encrypted Hash information. The decrypted result will be compared with the calculated result in step 7, to determine whether the firmware and the load command matches or not, are normal or not. Under the circumstance that the firmware and the load command are both normal, the skip command starts to execute skip action, and the device works normally; under the circumstance that the firmware and the load command are verified to be abnormal, the chip will be reset until the firmware and the load command turn normal.

Through the above-mentioned Boot loader and the key starting flows of each section, the normal and safe starting of the device is ensured. That is to say, the device is started under the circumstance that only the firmware and the load command are both normal. When the firmware or the load command is abnormal, the chip will be reset, and the device will be rebooted again and again. In this way, the running of abnormal command or the load of abnormal firmware can be prevented.

Device Embodiment

In this embodiment, a WiMAX terminal with starting protection function is provided, and it is preferably applied for realizing the method in the method embodiment.

Figure 5:
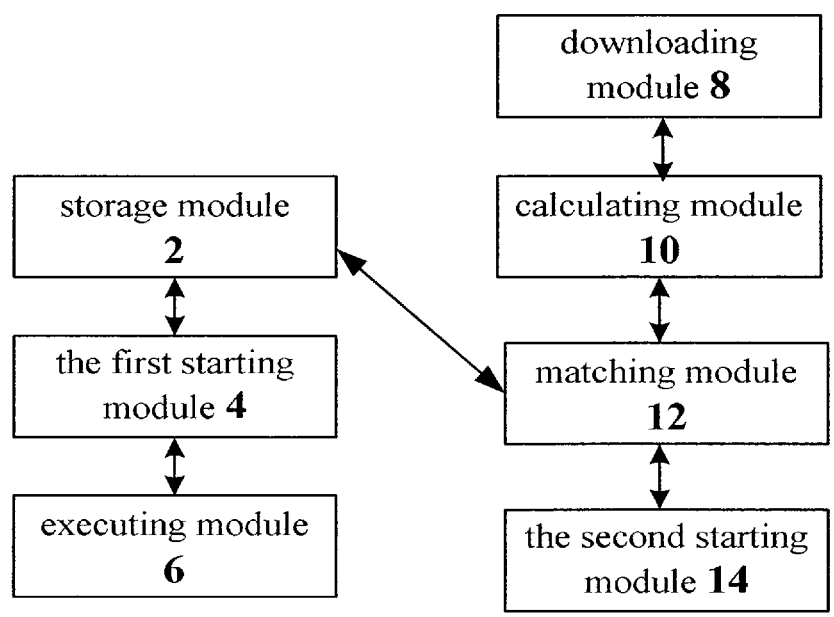
FIG. 5 is a block diagram of the WiMAX terminal according to a device embodiment of the present invention.

FIG. 5 is a block diagram of the WiMAX terminal according to a device embodiment of the present invention. As shown in FIG. 5, the WiMAX terminal with the starting protection function according to the embodiment comprises: a storage module 2, a starting module 4, an executing module 6, a downloading module 8, a calculating module 10, a matching module 12 and a second starting module 14. Each module will be detailed hereafter:

The storage module 2 is configured to store a first firmware Hash and a first load command Hash obtained through calculating a load command and a firmware required to be loaded for starting the terminal in advance.

Wherein, the storage module 2 can represent one or a plurality of devices for storing data which comprise read only memory (ROM), random access memory (RAM), magnetic RAM, magnetic core memory, magnetic disc storage media, optical storage media, flash memory device, and/or other machine readable media for storing information.

The first starting module 4, in response to a starting request or starting operation of the terminal, starts the boot loader.

The executing module 6 is connected to the first starting module 4, and is configured to execute the load command transmitted by a driver module of the terminal;

the downloading module 8 is configured to download the firmware to the terminal;

the calculating module 10 is connected with the downloading module 8, and is configured to calculate a second firmware Hash of the downloaded firmware and a second load command Hash of the load command transmitted by the driver module;

the matching module 12 is connected to the storage module 2 and the calculating module 10, is configured to judge whether the first firmware Hash stored in the storage module 2 matches with the second firmware Hash calculated by the calculating module 10, and to judge whether the first load command Hash stored in the storage module 2 matches with the second load command Hash calculated by the calculating module 10, and preferably to output the matching results;

The second starting module 14 is connected to the matching module 12, is configured to start the terminal under the circumstances that the first firmware Hash matches with the second firmware Hash, and the first load command Hash matches with the second load command Hash according to the matching results of the matching module 12.

The executing module 6, downloading module 8, calculating module 10, matching module 12 and the second starting module 14 can be integrated in one import module.

All in all, the embodiments of the present invention can realize complete security, namely, firmware and load command double verification. The verification process is executed inside the terminal device, and the execution time is comparatively short, so that the verification is not easy to be detected or intercepted, and the security is comparatively high. At the same time, the embodiments of the present invention merge the security verification function into the Boot flow of the device very well, improve the starting efficiency of the device under the precondition of ensuring the security. All the WiMAX terminal products designed on the basis of mainstream WiMAX terminal chip can apply the technical scheme provided by the embodiments of the present invention to perform safe Boot for the device. Therefore, the technical scheme has comparatively good compatibility. The safe Boot flow can bring security and profit protection commonly for operators, device suppliers and users, can refill the security leak of the WiMAX terminal chip manufacturer in business operation field, and moreover reduces the operation risk of the operators and the after-sale risk of the device suppliers.

Through the technical scheme of the embodiments of the present invention, the present invention can realize complete security protection to the starting of the terminal, and improve the starting efficiency of the terminal. Furthermore, the processing of the protection is not easy to be detected or intercepted. The present invention has extraordinary high security, consequently brings security and profit protection commonly for operators, device suppliers and users, can refill the security leak of the WiMAX terminal chip manufacturer in business operation field, and moreover reduces the operation risk of the operators and the after-sale risk of the device suppliers.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storage device and executed by the calculating device, or they can be made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. A starting method of a World Interoperability for Microwave Access (WiMAX) terminal, comprising:
    S202, performing calculations for a load command and a firmware which are required to be loaded for starting the terminal in advance to obtain a first firmware Hash value and a first load command Hash value, and storing the first firmware Hash value and the first load command Hash value in a predefined memory of the terminal;
    S204, in response to a starting operation of the terminal, performing starting process and starting a boot loader;
    S206, the boot loader executing the load command transmitted by a driver of the terminal and downloading the firmware to the terminal;
    S208, the boot loader calculating a second firmware Hash value of the downloaded firmware and a second load command Hash value of the load command transmitted by the driver;
    S210, the boot loader judging whether the first firmware Hash value matches with the second firmware Hash value, and judging whether the first load command Hash value matches with the second load command Hash value, and permitting to start the terminal under the circumstances that the first firmware Hash value matches with the second firmware Hash value and the first load command Hash value matches with the second load command Hash value.

2. The method according to claim 1, wherein in step S202, storing the first firmware Hash value and the first load command Hash value in a predefined memory of the terminal comprises:
    encrypting the first firmware Hash value and the first load command Hash value using a public key;
    storing the encrypted first firmware Hash and first load command Hash in the predefined memory;
    after the storing, step S202 further comprises:
    storing a private key corresponding to the public key in the terminal.

3. The method according to claim 2, wherein in step S210, before judging whether the Hash values are matching, the method further comprises:
    the boot loader decrypting the encrypted first firmware Hash value and first load command Hash value by using the stored private key, to obtain a decrypted first firmware Hash value and a decrypted first load command Hash value;
    the operation of judging whether the Hash values are matching comprises: judging whether the decrypted first firmware Hash value matches with the second firmware Hash value, and judging whether the decrypted first load command Hash value matches with the second load command Hash value.

4. The method according to claim 1, wherein in step S204, the starting process comprises:
    after the terminal is powered on, resetting a chip of the terminal;
    a CPU of the terminal running specific code in the chip to start a read only memory of the terminal, initializing the hardware units required for starting the read only memory, and performing corresponding pin configuration;
    the CPU reading interface configuration information stored in a non-volatile memory of the terminal.

5. The method according to claim 1, wherein before step S210, the method further comprises:
    the driver transmitting the first firmware Hash value and the first load command Hash value to the chip of the terminal through a specific command; the boot loader obtaining the first firmware Hash value and the first load command Hash value in the specific command, wherein the specific command is used to start the terminal.

6. The method according to claim 5, wherein the boot loader executes the specific command under the circumstances that the boot loader judges the first firmware Hash value matches with the second firmware Hash value, and the first load command Hash value matches with the second load command Hash value.

7. The method according to claim 5, wherein the specific command is a skip command.

8. The method according to claim 1 wherein in step S210, under the circumstance that the boot loader judges the first firmware Hash value does not match with the second firmware Hash value, and/or the first load command Hash value does not match with the second load command Hash value, the chip of the terminal is reset.

9. A World Interoperability for Microwave Access (WiMAX) terminal, comprising:
    a storage module (2), configured to store a first firmware Hash value and a first load command Hash value which are obtained through performing calculations for a load command and a firmware which are required to be loaded for starting the terminal in advance;
    a first starting module (4), configured to perform starting process and to start a boot loader in response to a starting operation of the terminal;
    an executing module (6), configured to execute the load command transmitted by a driving module of the terminal;
    a downloading module (8), configured to download the firmware to the terminal;
    a calculating module (10), configured to calculate a second firmware Hash value of the downloaded firmware and a second load command Hash value of the load command transmitted by the driver module;

a matching module (12), configured to judge whether the first firmware Hash value stored in the storage module matches with the second firmware Hash value calculated by the calculating module, and to judge whether the first load command Hash value stored in the storage module matches with the second load command Hash value calculated by the calculating module; and a second starting module (14), configured to permit to start the terminal under the circumstances that the judging result of the matching module is: the first firmware Hash value matches with the second firmware Hash value and the first load command Hash value matches with the second load command Hash value.

10. The method according to claim 2, wherein in step S210, under the circumstance that the boot loader judges the first firmware Hash value does not match with the second firmware Hash value, and/or the first load command Hash value does not match with the second load command Hash value, the chip of the terminal is reset.

11. The method according to claim 3, wherein in step S210, under the circumstance that the boot loader judges the first firmware Hash value does not match with the second firmware Hash value, and/or the first load command Hash value does not match with the second load command Hash value, the chip of the terminal is reset.

12. The method according to claim 4, wherein in step S210, under the circumstance that the boot loader judges the first firmware Hash value does not match with the second firmware Hash value, and/or the first load command Hash value does not match with the second load command Hash value, the chip of the terminal is reset.

13. The method according to claim 5, wherein in step S210, under the circumstance that the boot loader judges the first firmware Hash value does not match with the second firmware Hash value, and/or the first load command Hash value does not match with the second load command Hash value, the chip of the terminal is reset.

14. The method according to claim 6, wherein in step S210, under the circumstance that the boot loader judges the first firmware Hash value does not match with the second firmware Hash value, and/or the first load command Hash value does not match with the second load command Hash value, the chip of the terminal is reset.

15. The method according to claim 7, wherein in step S210, under the circumstance that the boot loader judges the first firmware Hash value does not match with the second firmware Hash value, and/or the first load command Hash value does not match with the second load command Hash value, the chip of the terminal is reset.

* * * * *